United States Patent
Nogami et al.

(10) Patent No.: US 11,235,478 B2
(45) Date of Patent: Feb. 1, 2022

(54) SENSOR UNIT, CONTROL METHOD, AND NON-TRANSITORY RECORDING MEDIUM

(71) Applicant: OMRON Corporation, Kyoto (JP)

(72) Inventors: Hidekatsu Nogami, Kusatsu (JP); Yahiro Koezuka, Kusatsu (JP); Yoshimitsu Nakano, Ritto (JP); Arata Kataoka, Otsu (JP)

(73) Assignee: OMRON Corporation, Kyoto (JP)

( * ) Notice: Subject to any disclaimer, the term of this patent is extended or adjusted under 35 U.S.C. 154(b) by 606 days.

(21) Appl. No.: 16/190,151

(22) Filed: Nov. 14, 2018

(65) Prior Publication Data
US 2019/0248027 A1    Aug. 15, 2019

(30) Foreign Application Priority Data
Feb. 14, 2018 (JP) .............................. JP2018-024357

(51) Int. Cl.
| | | |
|---|---|---|
| *B25J 19/02* | (2006.01) | |
| *G01P 15/08* | (2006.01) | |
| *G06F 11/30* | (2006.01) | |
| *G05B 23/02* | (2006.01) | |
| *B23Q 17/09* | (2006.01) | |

(52) U.S. Cl.
CPC .......... *B25J 19/02* (2013.01); *B23Q 17/0971* (2013.01); *G01P 15/08* (2013.01); *G05B 23/0218* (2013.01); *G05B 23/0221* (2013.01); *G05B 23/0235* (2013.01); *G06F 11/3058* (2013.01);
(Continued)

(58) Field of Classification Search
CPC ...... B25J 19/02; B23Q 17/0971; G01P 15/08; G05B 23/0218; G05B 23/0221; G05B 23/0235; G05B 2219/37435; G05B 2219/37534; G06F 11/3058
See application file for complete search history.

(56) References Cited

U.S. PATENT DOCUMENTS

| | | |
|---|---|---|
| 4,636,779 A | 1/1987 | Thomas et al. |
| 9,304,033 B2 * | 4/2016 | Hedin .................... G01H 1/003 |

(Continued)

FOREIGN PATENT DOCUMENTS

| | | |
|---|---|---|
| CN | 102308190 | 1/2012 |
| CN | 102308194 | 1/2012 |

(Continued)

OTHER PUBLICATIONS

"Search Report of Europe Counterpart Application", dated May 23, 2019, p. 1-p. 8.
(Continued)

*Primary Examiner* — Aditya S Bhat
(74) *Attorney, Agent, or Firm* — JCIPRNET (57) ABSTRACT

In the disclosure, a failure of a device performing work while moving is more reliably detected while the data amount of failure diagnosis data is reduced. The disclosure includes a frequency analyzing part which performs a frequency analysis on acquired data from an acceleration sensor; a maximum frequency detecting part which detects a maximum frequency from a result of the frequency analysis; and a failure diagnosis data generating part which sets a frequency twice or more of the maximum frequency as a sampling frequency, samples the acquired data from the acceleration sensor, and generates the failure diagnosis data.

10 Claims, 7 Drawing Sheets

(52) U.S. Cl.
CPC .............. *G05B 2219/37435* (2013.01); *G05B 2219/37534* (2013.01)

(56) References Cited

U.S. PATENT DOCUMENTS

| | | | | |
|---|---|---|---|---|
| 2008/0033695 | A1* | 2/2008 | Sahara | G01H 1/003 |
| | | | | 702/185 |
| 2009/0164142 | A1* | 6/2009 | Studer | G01H 1/003 |
| | | | | 702/33 |
| 2012/0296449 | A1* | 11/2012 | Kimura | G05B 19/404 |
| | | | | 700/57 |
| 2015/0003560 | A1 | 1/2015 | Flanagan et al. | |

FOREIGN PATENT DOCUMENTS

| | | |
|---|---|---|
| CN | 102735968 | 10/2012 |
| CN | 103048488 | 4/2013 |
| CN | 103684910 | 3/2014 |
| CN | 104251713 | 12/2014 |
| CN | 106500830 | 3/2017 |
| GB | 2166241 | 4/1986 |
| JP | 2002323355 | 11/2002 |
| JP | 2017016187 | 1/2017 |
| WO | 2007008940 | 1/2007 |
| WO | 2010074643 | 7/2010 |

OTHER PUBLICATIONS

"Office Action of China Counterpart Application" with English translation thereof, dated Nov. 23, 2021, p. 1-p. 19.

* cited by examiner

SENSOR UNIT, CONTROL METHOD, AND NON-TRANSITORY RECORDING MEDIUM

CROSS-REFERENCE TO RELATED APPLICATION

This application claims the priority benefit of Japan Application No. 2018-024357, filed on Feb. 14, 2018. The entirety of the above-mentioned patent application is hereby incorporated by reference herein and made a part of this specification.

BACKGROUND

Technical Field

The disclosure relates to a sensor unit, a control method, a program, and a recording medium.

Description of Related Art

Conventionally, the technique of generating failure diagnosis data from acquired data from a sensor mounted on a robot (a device performing work while moving) and detecting a failure of the robot by using this failure diagnosis data is known. In this technique, the data amount of the failure diagnosis data is required to be reduced. This is because if the data amount of the failure diagnosis data is too large, it is difficult to transmit the failure diagnosis data by a wireless communication method.

As an example of the technique for reducing the data amount of the failure diagnosis data, a technique in which the sampling frequency for sampling the acquired data from the sensor is lowered at the time when the value of the acquired data from the sensor not higher than a predetermined threshold (see Patent Document 1: Japanese Laid-Open No. 2017-016187, published on Jan. 19, 2017) is provided.

However, there are cases in which the defect due to a failure of the robot appears more prominently at the time when the absolute value of the acquired data from the sensor is almost 0 than the time when the absolute value of the acquired data is large.

An example of the above cases includes the case where an acceleration sensor measuring acceleration related to movement of the robot is used as the sensor. That is, the defect can appear prominently at the time when the robot is moving at a high speed. In addition, at the time when the robot is moving at a constant speed, the absolute value of the acquired data from the acceleration sensor is almost zero. In other words, in the case where the acceleration sensor is used as the sensor, at the time when the robot is moving at a constant high speed, the defect can appear prominently even though the absolute value is almost 0. As an example of this defect, the robot may vibrate greatly when moving owing that the bearings provided on the joints of the robot are damaged.

In the case where the technique of lowering the sampling frequency for sampling the acquired data from the acceleration sensor at the time when the absolute value of the acquired data from the acceleration sensor is not higher than the predetermined threshold is applied, the following problem occurs. That is, in this case, at the time when the defect appears prominently, the sampling frequency may be lowered since the absolute value of the acquired data from the acceleration sensor is small. As a result, despite that this defect appears prominently, the failure of the robot may not be detected due to the failure in detecting this defect.

SUMMARY

An embodiment of the disclosure provides a sensor unit outputting failure diagnosis data for detecting a failure of a device performing work while moving. The sensor unit includes an acceleration sensor measuring acceleration related to the moving; a frequency analyzing part performing a frequency analysis on acquired data from the acceleration sensor; a maximum frequency detecting part detecting a maximum frequency which is the highest frequency among at least one type of frequency having a level not lower than a predetermined threshold from a result of the frequency analysis; and a failure diagnosis data generating part setting a frequency twice or more of the maximum frequency as a sampling frequency, sampling the acquired data from the acceleration sensor, and generating the failure diagnosis data.

An embodiment of the disclosure provides a control method of a sensor unit including an acceleration sensor that measures acceleration related to moving of a device performing work while moving, and outputting failure diagnosis data for detecting a failure of the device. The control method includes: performing a frequency analysis on acquired data from the acceleration sensor; detecting a maximum frequency that is the highest frequency among at least one type of frequency having a level not lower than a predetermined threshold from a result of the frequency analysis; and setting a frequency twice or more of the maximum frequency as a sampling frequency, sampling the acquired data from the acceleration sensor, and generating the failure diagnosis data.

The control method according to an embodiment of the disclosure may also be executed by a computer. In this case, the scope of the disclosure also includes a program for causing a computer to execute the control method and a recording medium that is computer-readable and stores the program.

DESCRIPTION OF THE EMBODIMENTS

The disclosure provides a sensor unit, a control method, a program, and a recording medium which makes it possible to more reliably detect the failure of the device performing work while moving, while reducing the data amount of the failure diagnosis data.

An embodiment of the disclosure provides a sensor unit outputting failure diagnosis data for detecting a failure of a device performing work while moving. The sensor unit includes an acceleration sensor measuring acceleration related to the moving; a frequency analyzing part performing a frequency analysis on acquired data from the acceleration sensor; a maximum frequency detecting part detecting a maximum frequency which is the highest frequency among at least one type of frequency having a level not lower than a predetermined threshold from a result of the frequency analysis; and a failure diagnosis data generating part setting a frequency twice or more of the maximum frequency as a sampling frequency, sampling the acquired data from the acceleration sensor, and generating the failure diagnosis data.

An embodiment of the disclosure provides a control method of a sensor unit including an acceleration sensor that measures acceleration related to moving of a device performing work while moving, and outputting failure diagnosis data for detecting a failure of the device. The control method includes: performing a frequency analysis on acquired data from the acceleration sensor; detecting a maximum frequency that is the highest frequency among at least one type of frequency having a level not lower than a predetermined threshold from a result of the frequency analysis; and setting a frequency twice or more of the maximum frequency as a sampling frequency, sampling the acquired data from the acceleration sensor, and generating the failure diagnosis data.

According to the above configuration, by sampling the acquired data from the acceleration sensor, the acquired data from the acceleration sensor can be thinned out appropriately, so it is possible to reduce the data amount of the failure diagnosis data. Further, according to the above configuration, the sampling frequency is set to such a degree that it is possible to detect the component of the maximum frequency included in the acquired data from the acceleration sensor, and the acquired data from the acceleration sensor is sampled. Accordingly it is possible to detect a defect due to a failure of this device regardless of whether the device performing work while moving is moving at constant speed.

Therefore, according to the above configuration, it is possible to more reliably detect the failure of the device while reducing the data amount of the failure diagnosis data.

According to an embodiment of the disclosure, the sensor unit includes an output stopping part stopping outputting of the failure diagnosis data in a case where the maximum frequency is lower than a predetermined frequency.

According to the above configuration, the output stopping part stops outputting of the failure diagnosis data at the time when the defect is considered as not appearing. Thus, in the stage of outputting, an effect equivalent to reducing the data amount of the failure diagnosis data can be obtained.

According to an embodiment of the disclosure, in the sensor unit, the frequency analyzing part performs Fourier transform as the frequency analysis.

According to the above configuration, a high-accuracy frequency analysis can be performed.

According to an embodiment of the disclosure, in the sensor unit, the frequency analyzing part has a first high-pass filter cutting off a component having a frequency not higher than a cutoff frequency in the acquired data from the acceleration sensor and allowing a component having a frequency exceeding the cutoff frequency to pass through, and the maximum frequency detecting part sets the cutoff frequency of the first high-pass filter as the maximum frequency if a level of the component passing through the first high-pass filter in the acquired data from the acceleration sensor is smaller than a predetermined value.

Also, according to an embodiment of the disclosure, in the sensor unit, it may also be set that the frequency analyzing part has two or more high-pass filters which at least include a first high-pass filter and a second high-pass filter, the second high-pass filter being supplied with a component passing through the first high-pass filter in the acquired data from the acceleration sensor, and the second high-pass filter having a cutoff frequency higher than a cutoff frequency of the first high-pass filter, and the failure diagnosis data generating part sets a frequency twice or more of the cutoff frequency of the second high-pass filter as the sampling frequency when the maximum frequency is higher than the cutoff frequency of the first high-pass filter and is not higher than the cutoff frequency of the second high-pass filter.

According to the above configuration, it is possible to perform a frequency analysis under a low central processing unit (CPU) processing capability.

According to an embodiment of the disclosure, in the sensor unit, the frequency analyzing part intermittently performs the frequency analysis.

According to the above configuration, it is possible to reduce power consumption due to the frequency analysis.

According to an embodiment of the disclosure, in the sensor unit, the frequency analyzing part stops the frequency analysis at a time when an absolute value of the acquired data from the acceleration sensor is not lower than a predetermined threshold.

The absolute value of the acquired data from the acceleration sensor being not lower than the predetermined threshold means that the robot is accelerating. In other words, the movement of the robot is at a low speed. When the movement of the robot is at a low speed, the defect hardly appears prominently, as compared to the time when the movement of the robot is at a high speed. According to the above configuration, in the period in which the defect hardly appears prominently, the frequency analyzing part stops the frequency analysis, so the power consumption due to the frequency analysis can be more effectively reduced.

The control method according to an embodiment of the disclosure may also be executed by a computer. In this case, the scope of the disclosure also includes a program for causing a computer to execute the control method and a recording medium that is computer-readable and stores the program.

According to an embodiment of the disclosure, it is possible to more reliably detect the failure of a device performing work while moving, while reducing the data amount of the failure diagnosis data.

Hereinafter, embodiments according to one aspect of the disclosure (hereinafter also referred to as "this embodiment") will be described with reference to the drawings. However, in all respects, this embodiment described below is merely an example of the disclosure. It goes without saying that various improvements or modifications can be made without departing from the scope of the disclosure. In other words, a specific configuration according to the embodiment may be appropriately adopted when implementing the disclosure.

§ 1 Application Example

Firstly, with reference to FIGS. 1 to 4, an example of a situation for which the disclosure is suitable is described.

Figure 1:
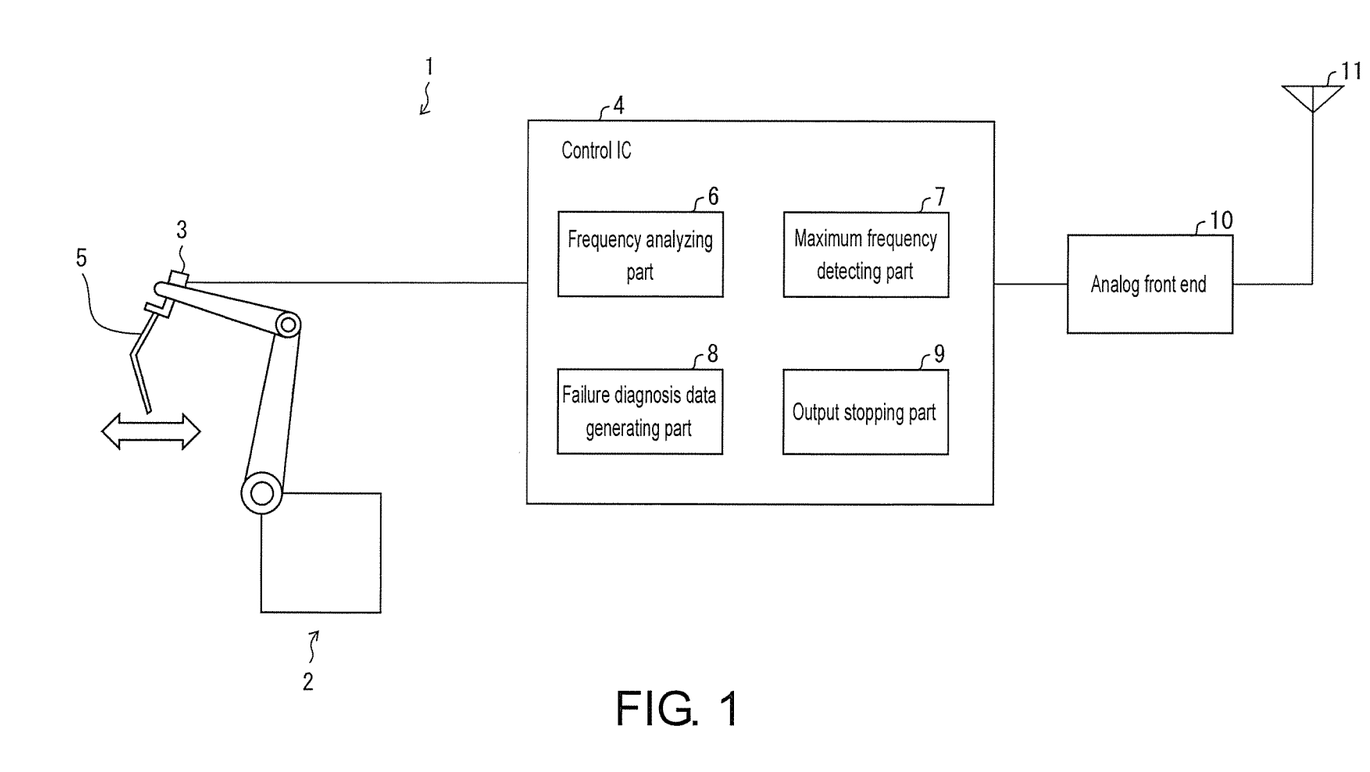
FIG. 1 is a circuit block diagram showing a schematic configuration of a sensor unit according to an embodiment of one aspect of the disclosure.

FIG. 1 is a circuit block diagram showing a schematic configuration of a sensor unit 1 according to this embodiment. The sensor unit 1 outputs failure diagnosis data for detecting a failure of a robot 2 (a device performing work while moving). The sensor unit 1 includes an acceleration sensor 3, a control integrated circuit (IC) 4, and an analog front end 10.

Figure 2:
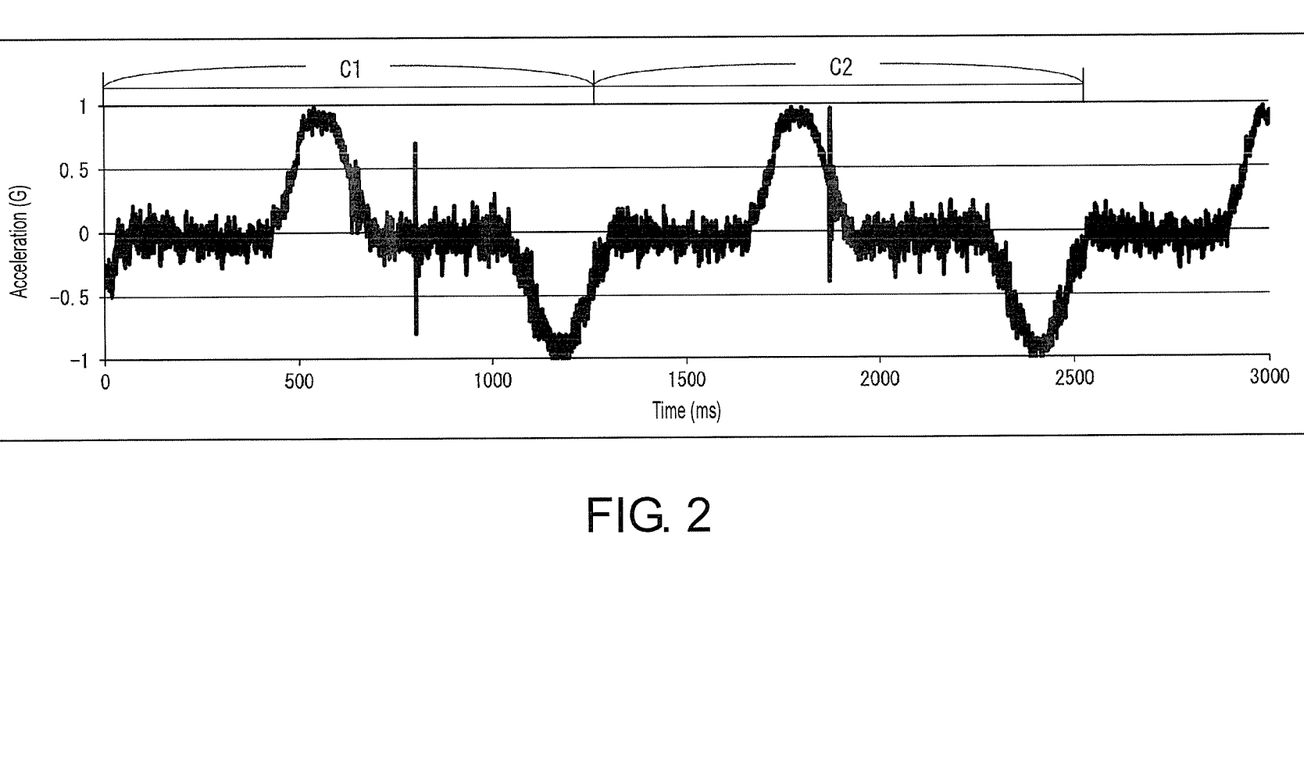
FIG. 2 is a graph showing an example of acquired data from an acceleration sensor.

FIG. 2 is a graph showing an example of acquired data from the acceleration sensor 3. In the graph shown in FIG. 2, the horizontal axis represents time (unit: ms) and the vertical axis represents acceleration (unit: G). Here, an example in which the acquired data from the acceleration sensor 3 includes a first cycle C1 and a second cycle C2 is shown.

The acceleration sensor 3 is mounted on the robot 2 and measures the acceleration related to moving of the robot 2 by sampling based on a predetermined sampling frequency (hereinafter referred to as "measurement sampling frequency"). An arm 5 of the robot 2 may serve as an example of the portion actually moving in the robot 2. The measurement result of the acceleration related to the moving of the robot 2 is equivalent to the acquired data from the acceleration sensor 3 to be described later. The acquired data from the acceleration sensor 3 includes not only the acceleration related to the main movement of the robot 2 but also vibrations depending on the surrounding environment and vibrations due to the driving mechanism of the robot 2.

The control IC 4 has a frequency analyzing part 6, a maximum frequency detecting part 7, a failure diagnosis data generating part 8, and an output stopping part 9. The frequency analyzing part 6 performs a frequency analysis on the acquired data from the acceleration sensor 3.

Figure 3:
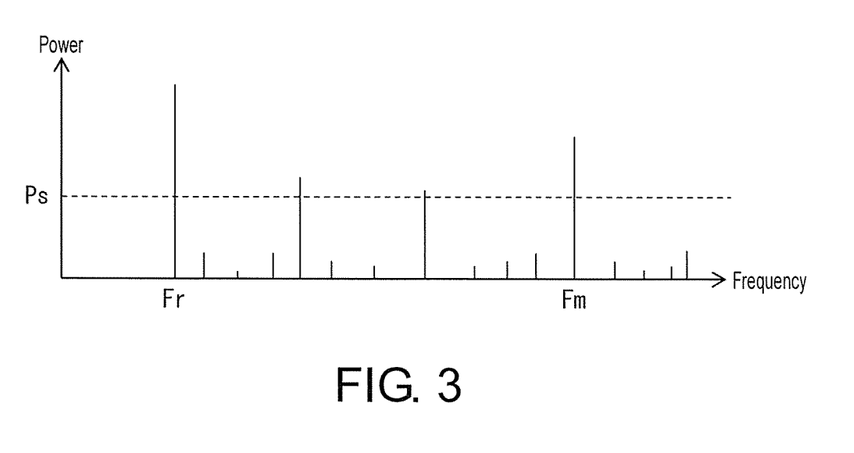
FIG. 3 is a graph showing an example of a frequency spectrum corresponding to a first cycle of the acquired data from the acceleration sensor.

FIG. 3 is a graph showing an example of a frequency spectrum corresponding to the first cycle C1 of the acquired data from the acceleration sensor 3. In the graph shown in FIG. 3, the horizontal axis represents frequency, and the vertical axis represents power (level). The level includes the power and the value itself of the signal.

Figure 4:
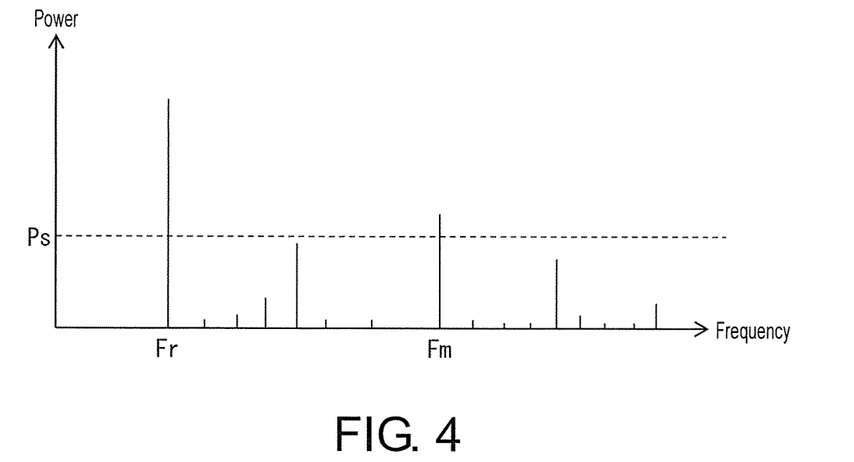
FIG. 4 is a graph showing an example of a frequency spectrum corresponding to a second cycle of the acquired data from the acceleration sensor.

FIG. 4 is a graph showing an example of a frequency spectrum corresponding to the second cycle C2 of the acquired data from the acceleration sensor 3. In the graph shown in FIG. 4, the horizontal axis represents frequency and the vertical axis represents power.

That is, here, an example in which the frequency spectra shown in FIGS. 3 and 4 are respectively obtained in the first cycle C1 and the second cycle C2 of the acquired data from the acceleration sensor 3 will be described.

The maximum frequency detecting part 7 and the failure diagnosis data generating part 8 perform the following operation with respect to each of the first cycle C1 and the second cycle C2 of the acquired data from the acceleration sensor 3.

The maximum frequency detecting part 7 detects a maximum frequency Fm from the result of the frequency analysis performed by the frequency analyzing part 6. The maximum frequency Fm is the highest frequency among at least one type of frequency having a power not lower than a predetermined threshold Ps. Besides, an operating frequency Fr of the robot 2 shown in FIG. 3 or the like is a frequency corresponding to the acceleration change related to the main movement of the robot 2.

The failure diagnosis data generating part 8 sets a frequency twice or more of the maximum frequency Fm as a sampling frequency, samples the acquired data from the acceleration sensor 3, and generates the failure diagnosis data. It should be noted that the sampling frequency set by the failure diagnosis data generating part 8 needs to be not higher than the measurement sampling frequency.

According to the sensor unit 1, the acquired data from the acceleration sensor 3 can be thinned out appropriately by sampling the acquired data from the acceleration sensor 3, so it is possible to reduce the data amount of the failure diagnosis data. Further, according to the sensor unit 1, the sampling frequency is set to such a degree that it is possible to detect the component of the maximum frequency Fm included in the acquired data from the acceleration sensor 3, and the acquired data from the acceleration sensor 3 is sampled. Accordingly, it is possible to detect a defect due to failure of the robot 2 regardless of whether the robot 2 is moving at a constant speed.

Therefore, according to the sensor unit 1, it is possible to more reliably detect the failure of the robot 2 while reducing the data amount of the failure diagnosis data.

The output stopping part 9 will be described in detail in the following "§ 2 Configuration Example" section.

The failure diagnosis data generated by the sensor unit 1 is transmitted from an antenna 11 to another electronic device (not shown) via the analog front end 10. For example, the electronic device may be a radio frequency identification (RFID) reader, a controller of the robot 2, and a controller that comprehensively controls a network system including the robot 2. When the electronic device is an RFID reader, the sensor unit 1 may be an RFID tag. In the sensor unit 1, while it is assumed that a wireless communication method serves as the method of transmitting the failure diagnosis data to the electronic device, a wired communication method may also be used. Although the antenna 11 is a component of the configuration of the sensor unit 1, the antenna 11 is not a necessary configuration for solving the problem.

§ 2 Configuration Example

Figure 5:
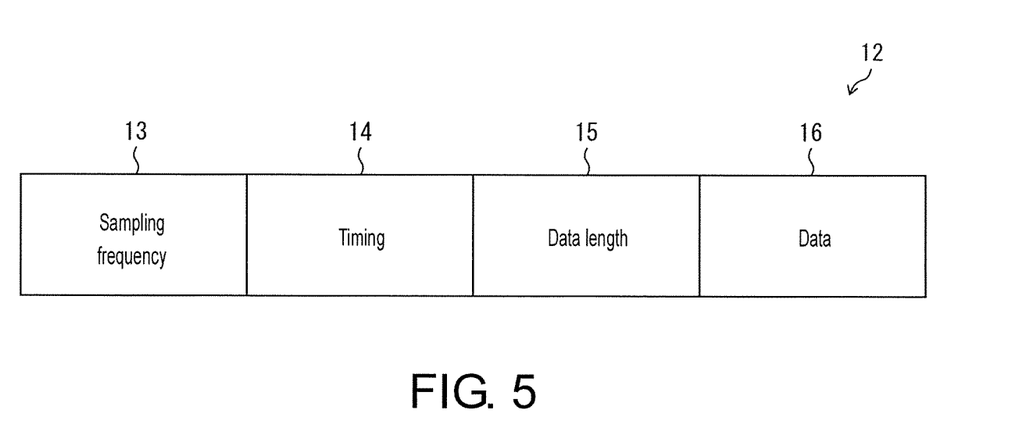
FIG. 5 is a diagram showing an example of a transmission packet in failure diagnosis data corresponding to FIG. 3 or FIG. 4.

FIG. 5 is a diagram showing an example of a transmission packet 12 in the failure diagnosis data corresponding to FIG. 3 or FIG. 4. The transmission packet 12 includes data 13 to data 16.

The data 13 indicates the sampling frequency for sampling the acquired data from the acceleration sensor 3. The data 14 indicates the timing such as time. The data 15 indicates the data length in the sampled content of the acquired data from the acceleration sensor 3. The data 16 shows what is in the content.

Figure 6:
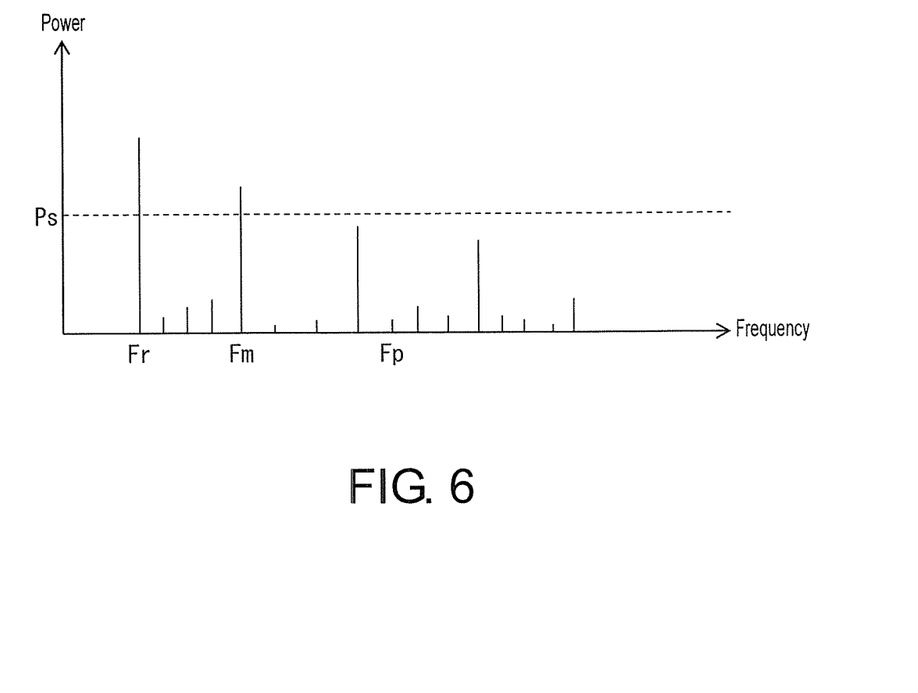
FIG. 6 is a graph showing another example of the frequency spectrum corresponding to the second cycle of the acquired data from the acceleration sensor.

FIG. 6 is a graph showing another example of the frequency spectrum corresponding to the second cycle C2 of the acquired data from the acceleration sensor 3. In the graph shown in FIG. 6, the horizontal axis represents frequency and the vertical axis represents power.

That is, here, an example in which the frequency spectrum shown in FIG. 6 is obtained in the second cycle C2 of the acquired data from the acceleration sensor 3 will be described.

The output stopping part 9 stops the sensor unit 1 from outputting the failure diagnosis data in the case where the maximum frequency Fm is lower than the predetermined frequency Fp in the result of the frequency analysis performed by the frequency analyzing part 6.

According to the sensor unit 1, the output stopping part 9 stops outputting of the failure diagnosis data at the time when the defect is considered as not appearing. Thus, in the stage in which the sensor unit 1 outputs the failure diagnosis data, an effect equivalent to reducing the data amount of the failure diagnosis data can be obtained.

Figure 7:
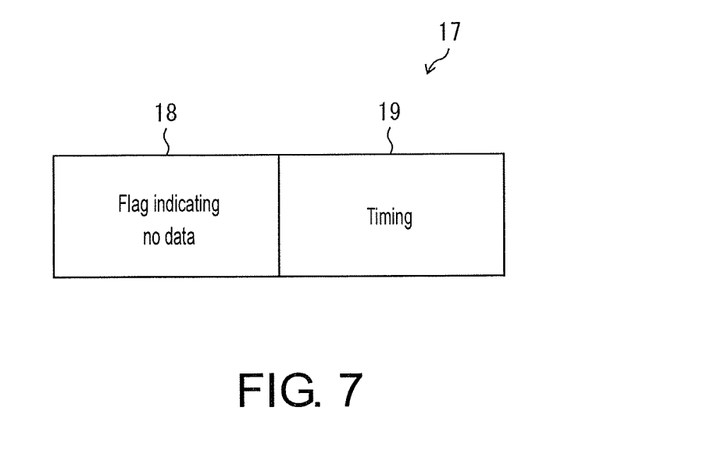
FIG. 7 is a diagram showing an example of a transmission packet in failure diagnosis data corresponding to FIG. 6.

FIG. 7 is a diagram showing an example of a transmission packet 17 in the failure diagnosis data corresponding to FIG. 6. The transmission packet 17 includes data 18 and data 19.

The data 18 is a flag indicating that there is no sampled content of the acquired data from the acceleration sensor 3. The data 19 shows the timing such as time.

The frequency analyzing part 6 performs Fourier transform such as Fast Fourier transform (FFT) as the frequency analysis. As a result, a high-accuracy frequency analysis can be performed.

The frequency analyzing part 6 may also perform the frequency analysis intermittently. As a result, it is possible to reduce power consumption due to the frequency analysis.

As a specific example, the frequency analyzing part 6 stops the frequency analysis at the time when the absolute value of the acquired data from the acceleration sensor 3 is not lower than a predetermined threshold. The absolute value of the acquired data from the acceleration sensor 3 being not lower than the predetermined threshold means that the robot 2 is accelerating. In other words, the movement of the robot 2 is at a low speed. At the time when the movement of the robot 2 is at a low speed, the defect hardly appears prominently, as compared to the time when the movement of the robot 2 is at a high speed. According to the above configuration, in the period in which the defect hardly appears prominently, the frequency analyzing part 6 stops the frequency analysis, so the power consumption due to the frequency analysis can be more effectively reduced.

Figure 8:
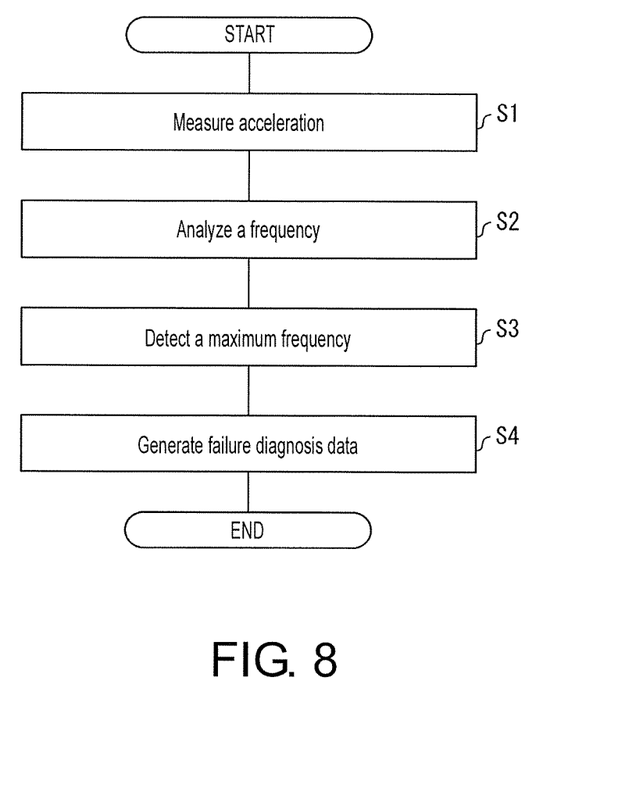
FIG. 8 is a flowchart showing a flow of operations in the sensor unit shown in FIG. 1.

FIG. 8 is a flowchart showing a flow of operations in the sensor unit 1.

First, the acceleration sensor 3 measures the acceleration related to moving of the robot 2 (Step S1).

Subsequently, the frequency analyzing part 6 performs the frequency analysis on the acquired data from the acceleration sensor 3 (Step S2).

Subsequently, the maximum frequency detecting part 7 detects the maximum frequency Fm from the result of the frequency analysis of Step S2 (Step S3). As described above, the maximum frequency Fm is the highest frequency among at least one type of frequency having a power not less than the predetermined threshold Ps.

Then, the failure diagnosis data generating part 8 sets the frequency twice or more of the maximum frequency Fm as the sampling frequency, samples the acquired data from the acceleration sensor 3 and generates the failure diagnosis data (Step S4).

In the sensor unit 1, the acquired data from the acceleration sensor 3 is divided into the first cycle C1 and the second cycle C2, and the maximum frequency detecting part 7 and the failure diagnosis data generating part 8 perform operations with respect to each of the first cycle C1 and the second cycle C2. On the other hand, the sensor unit 1 may also set the entire acquired data from the acceleration sensor 3 as one cycle, and the maximum frequency detecting part 7 and the failure diagnosis data generating part 8 may perform operations with respect to the one cycle. That is, it is not necessary in the sensor unit 1 that the acquired data from the acceleration sensor 3 be divided into a plurality of cycles and processed.

Figure 9:
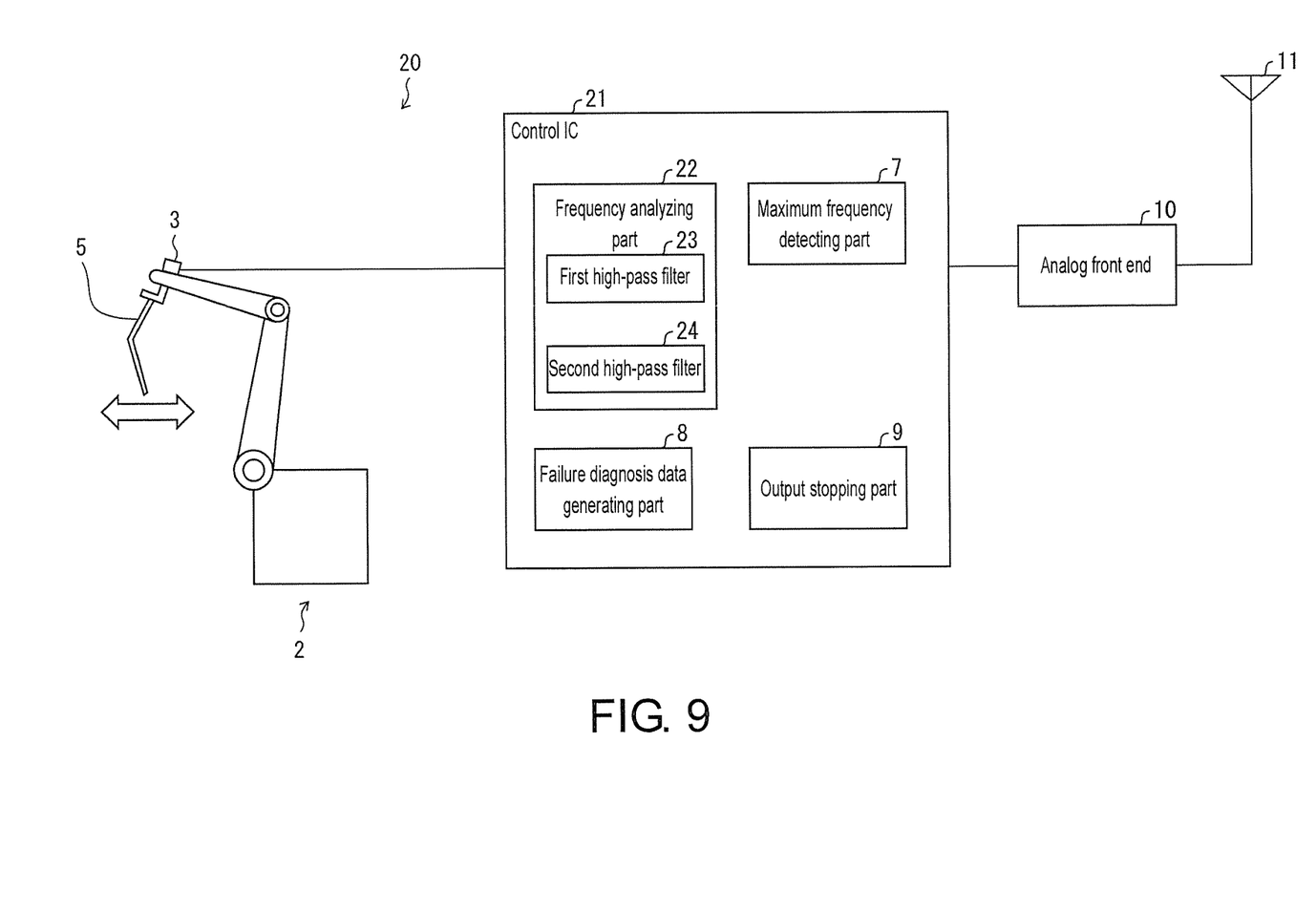
FIG. 9 is a circuit block diagram showing a schematic configuration of a modification of the sensor unit shown in FIG. 1.

FIG. 9 is a circuit block diagram showing a schematic configuration of a sensor unit 20, which is a modification of the sensor unit 1. Hereinafter, for the convenience of explanation, members having the same functions as those of the members already described above will be denoted by the same reference numerals, and the description thereof will not be repeated.

The sensor unit 20 has a control IC 21 in place of the control IC 4 for the sensor unit 1. The control IC 21 has a frequency analyzing part 22 in place of the frequency analyzing part 6 for the control IC 4. The frequency analyzing part 22 has a first high-pass filter 23 and a second high-pass filter 24.

The first high-pass filter 23 is supplied with the acquired data from the acceleration sensor 3. At least one high-pass filter (not shown) may be provided before the first high-pass filter 23. In this case, the first high-pass filter 23 is supplied with a component passing through the at least one high-pass filter in the acquired data from the acceleration sensor 3.

The second high-pass filter 24 is supplied with a component passing through the first high-pass filter 23 in the acquired data from the acceleration sensor 3. At least one high-pass filter (not shown) may be provided after the second high-pass filter 24.

Also, the cutoff frequencies of each of the at least one high-pass filter, the first high-pass filter 23, and the second high-pass filter 24 are set to be higher to an extent that data obtained from the acquired data from the acceleration sensor 3 can pass later. That is, a cutoff frequency Fc2 of the second high-pass filter 24 is higher than a cutoff frequency Fc1 of the first high-pass filter 23.

For this reason, the first high-pass filter 23 cuts off the component whose frequency is not higher than the cutoff frequency Fc1 of the first high-pass filter 23 itself in the acquired data from the acceleration sensor 3, and allows the component having a frequency exceeding the cutoff frequency Fc1 to pass through. Also, the second high-pass filter 24 cuts off the component whose frequency is not higher than the cutoff frequency Fc2 of the second high-pass filter 24 itself in the acquired data from the acceleration sensor 3, and allows the component having a frequency exceeding the cutoff frequency Fc2 to pass through.

Figure 10:
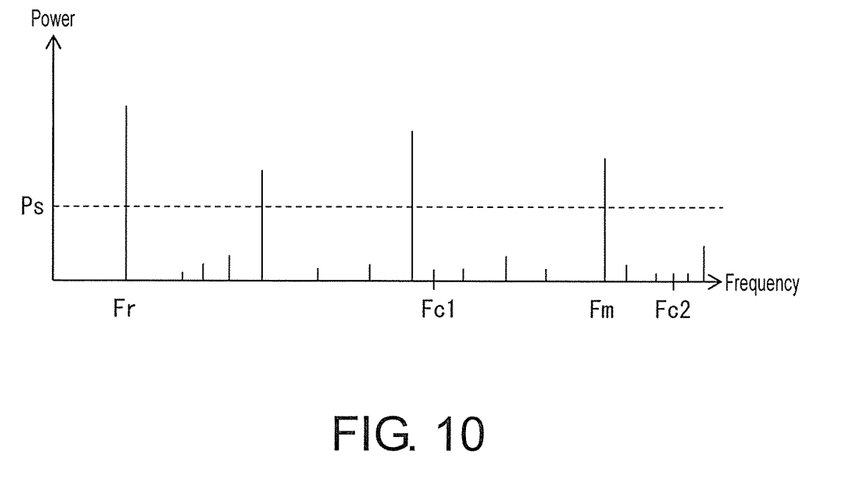
FIG. 10 is a graph showing still another example of the frequency spectrum corresponding to the second cycle of the acquired data from the acceleration sensor.

FIG. 10 is a graph showing still another example of the frequency spectrum corresponding to the second cycle C2 of the acquired data from the acceleration sensor 3. In the graph shown in FIG. 10, the horizontal axis represents frequency and the vertical axis represents power.

That is, here, an example in which the frequency spectrum shown in FIG. 10 is obtained in the second cycle C2 of the acquired data from the acceleration sensor 3 in the case where the frequency analysis is performed through Fast Fourier transform will be described.

Table 1 is a table showing an example of whether a frequency having a power not lower than the predetermined threshold Ps exists in each of the component passing through the first high-pass filter 23 in the acquired data from the acceleration sensor 3 and the component passing through the second high-pass filter 24 in the acquired data from the acceleration sensor 3. Table 1 shows an example corresponding to the result of the frequency analysis shown in FIG. 10.

Table 1 is a table showing an example of whether a frequency having a power not lower than a predetermined threshold exists in each of a component passing through a first high-pass filter in the acquired data from the acceleration sensor and a component passing through a second high-pass filter in the acquired data from the acceleration sensor.

| Component | Frequency having a power not lower than a threshold Ps |
|---|---|
| Passing through the first high-pass filter 23 | YES |
| Passing through the second high-pass filter 24 | NO |

According to FIG. 10 and Table 1, in the acquired data from the acceleration sensor 3, there is a frequency having a power not lower than the predetermined threshold Ps in the component passing through the first high-pass filter 23. Also, according to FIG. 10 and Table 1, in the acquired data from the acceleration sensor 3, there is no frequency having a power not lower than the predetermined threshold Ps in the component passing through the second high-pass filter 24. At these times, the maximum frequency detecting part 7 detects that the maximum frequency Fm is higher than the cutoff frequency Fc1 of the first high-pass filter 23 and not higher than the cutoff frequency Fc2 of the second high-pass filter 24.

In addition, in this case, the failure diagnosis data generating part 8 sets a frequency twice or more of the cutoff frequency Fc2 of the second high-pass filter 24 as the sampling frequency, samples the acquired data from the acceleration sensor 3, and generates the failure diagnosis data.

Also, when the value (level) of the component passing through the first high-pass filter 23 in the acquired data from the acceleration sensor 3 is smaller than a predetermined value, the maximum frequency detecting part 7 may also set the cutoff frequency Fc1 of the first high-pass filter 23 as the maximum frequency Fm. Besides, the second high-pass filter 24 may be omitted. In this case, if the value of the component passing through the first high-pass filter 23 is not smaller than the predetermined value, the measurement sampling frequency of the acceleration sensor 3 is set as the maximum frequency.

According to the sensor unit 20, the control IC 21 having the frequency analyzing part 22 is provided in place of the control IC 4 having the frequency analyzing part 6 for the sensor unit 1. Therefore, according to the sensor unit 20, compared with the sensor unit 1, it is possible to perform a frequency analysis under a low CPU processing capability.

Other than the robot 2, a processing machine for operation in a factory, an automatic guided vehicle (AVG), etc., for example, can serve as the device that performs work while moving.

The control block (particularly the frequency analyzing part 6, the maximum frequency detecting part 7, the failure diagnosis data generating part 8, and the output stopping part 9) of the sensor unit 1 may be realized by a logic chip (hardware) formed on an integrated circuit (IC chip), etc., such as the control IC 4. The control block (particularly the frequency analyzing part 22, the maximum frequency detecting part 7, the failure diagnosis data generating part 8, and the output stopping part 9) of the sensor unit 20 may be realized by a logic chip formed on an integrated circuit, etc., such as the control IC 21. Meanwhile, both the control block of the sensor unit 1 and the control block of the sensor unit 20 may be realized by software.

In the latter case, any one of the sensor unit 1 and the sensor unit 20 is provided with a computer that executes instructions of software, i.e., a program, that realizes the respective functions. The computer includes, for example, one or more processors, and has a recording medium that is computer-readable and stores the program. In the computer, the processor reads the program from the recording medium and executes the program. As the processor, a CPU, for example, can be used. As the recording medium, a tape, a disk, a card, a semiconductor memory, a programmable logic circuit, and the like can be used, other than a "non-transitory tangible medium" such as a read only memory (ROM). Further, a random access memory (RAM), etc., for developing the program may be further included. Moreover, the program may be supplied to the computer via an arbitrary transmission medium (a communication network, a broadcast wave or the like) capable of transmitting the program. In addition, an aspect of the disclosure may also be realized in a form of a data signal in which the program is realized through electronic transmission and which is embedded in a carrier wave.

The disclosure is not limited to the embodiments described above, various modifications are possible within the scope indicated in the claims, and embodiments obtained by appropriately combining technical means respectively disclosed in different embodiments are also included in the technical scope of the disclosure.

What is claimed is:

1. A sensor unit, outputting failure diagnosis data for detecting a failure of a device performing work while moving, the sensor unit comprising:
    an acceleration sensor measuring acceleration related to the moving;
    a frequency analyzing part performing a frequency analysis on acquired data from the acceleration sensor;
    a maximum frequency detecting part detecting a maximum frequency which is the highest frequency among at least one type of frequency having a level not lower than a predetermined threshold from a result of the frequency analysis; and
    a failure diagnosis data generating part, setting a frequency twice or more of the maximum frequency as a sampling frequency, sampling the acquired data from the acceleration sensor, and generating the failure diagnosis data,
    wherein the frequency analyzing part stops the frequency analysis at a time when an absolute value of the acquired data from the acceleration sensor is not lower than a predetermined threshold.

2. The sensor unit according to claim 1, comprising:
    an output stopping part stopping outputting of the failure diagnosis data in a case where the maximum frequency is lower than a predetermined frequency.

3. The sensor unit according to claim 2, wherein the frequency analyzing part performs Fourier transform as the frequency analysis.

4. The sensor unit according to claim 2, wherein
    the frequency analyzing part has a first high-pass filter cutting off a component having a frequency not higher than a cutoff frequency in the acquired data from the acceleration sensor and allowing a component having a frequency exceeding the cutoff frequency to pass through, and
    the maximum frequency detecting part sets the cutoff frequency of the first high-pass filter as the maximum frequency if a level of the component passing through the first high-pass filter in the acquired data from the acceleration sensor is smaller than a predetermined value.

5. The sensor unit according to claim 2, wherein:
the frequency analyzing part has two or more high-pass filters which at least comprise a first high-pass filter and a second high-pass filter, the second high-pass filter being supplied with a component passing through the first high-pass filter in the acquired data from the acceleration sensor, and the second high-pass filter having a cutoff frequency higher than a cutoff frequency of the first high-pass filter, and
the failure diagnosis data generating part sets a frequency twice or more of the cutoff frequency of the second high-pass filter as the sampling frequency when the maximum frequency is higher than the cutoff frequency of the first high-pass filter and is not higher than the cutoff frequency of the second high-pass filter.

6. The sensor unit according to claim 1, wherein the frequency analyzing part performs Fourier transform as the frequency analysis.

7. The sensor unit according to claim 1, wherein
the frequency analyzing part has a first high-pass filter cutting off a component having a frequency not higher than a cutoff frequency in the acquired data from the acceleration sensor and allowing a component having a frequency exceeding the cutoff frequency to pass through, and
the maximum frequency detecting part sets the cutoff frequency of the first high-pass filter as the maximum frequency if a level of the component passing through the first high-pass filter in the acquired data from the acceleration sensor is smaller than a predetermined value.

8. The sensor unit according to claim 1, wherein:
the frequency analyzing part has two or more high-pass filters which at least comprise a first high-pass filter and a second high-pass filter, the second high-pass filter being supplied with a component passing through the first high-pass filter in the acquired data from the acceleration sensor, and the second high-pass filter having a cutoff frequency higher than a cutoff frequency of the first high-pass filter, and
the failure diagnosis data generating part sets a frequency twice or more of the cutoff frequency of the second high-pass filter as the sampling frequency when the maximum frequency is higher than the cutoff frequency of the first high-pass filter and is not higher than the cutoff frequency of the second high-pass filter.

9. A control method of a sensor unit comprising an acceleration sensor that measures acceleration related to moving of a device performing work while moving, and outputting failure diagnosis data for detecting a failure of the device, the method comprising:
performing a frequency analysis on acquired data from the acceleration sensor;
detecting a maximum frequency that is the highest frequency among at least one type of frequency having a level not lower than a predetermined threshold from a result of the frequency analysis; and
setting a frequency twice or more of the maximum frequency as a sampling frequency, sampling the acquired data from the acceleration sensor, and generating the failure diagnosis data,
wherein the frequency analysis is stopped at a time when an absolute value of the acquired data from the acceleration sensor is not lower than a predetermined threshold.

10. A non-transitory recording medium storing a program for causing a computer to execute the control method according to claim 9.

* * * * *